United States Patent
Suh et al.

(10) Patent No.: US 9,749,580 B2
(45) Date of Patent: Aug. 29, 2017

(54) SIGNAL TRANSCEIVING APPARATUS AND SIGNAL TRANSCEIVING METHOD

(71) Applicant: LG ELECTRONICS INC., Seoul (KR)

(72) Inventors: Jongyeul Suh, Seoul (KR); Soojin Hwang, Seoul (KR); Jeehyun Choe, Seoul (KR)

(73) Assignee: LG ELECTRONICS INC., Seoul (KR)

(*) Notice: Subject to any disclaimer, the term of this patent is extended or adjusted under 35 U.S.C. 154(b) by 144 days.

(21) Appl. No.: 14/408,884

(22) PCT Filed: Nov. 19, 2013

(86) PCT No.: PCT/KR2013/010485
§ 371 (c)(1),
(2) Date: Feb. 13, 2015

(87) PCT Pub. No.: WO2014/077651
PCT Pub. Date: May 22, 2014

(65) Prior Publication Data
US 2015/0195488 A1 Jul. 9, 2015

Related U.S. Application Data

(60) Provisional application No. 61/728,184, filed on Nov. 19, 2012.

(51) Int. Cl.
*H04N 7/015* (2006.01)
*H04N 7/08* (2006.01)
(Continued)

(52) U.S. Cl.
CPC ............... *H04N 7/08* (2013.01); *H04N 7/015* (2013.01); *H04N 21/23614* (2013.01); *H04N 21/4345* (2013.01)

(58) Field of Classification Search
CPC ......... H04N 21/23614; H04N 21/4345; H04N 7/015; H04N 7/08
(Continued)

(56) References Cited

U.S. PATENT DOCUMENTS

| 9,414,095 B1 * | 8/2016 | Corda ................ H04L 63/0428 |
| 2001/0024569 A1 * | 9/2001 | Fujiwara ............... H04N 19/60 386/328 |

(Continued)

FOREIGN PATENT DOCUMENTS

| CN | 102238406 A | 11/2011 |
| EP | 2 031 789 A2 | 3/2009 |

(Continued)

OTHER PUBLICATIONS

Zupancic et al, Two-pass rate control for improved quality of experience in UHDTV delivery, Feb. 2017.*

(Continued)

*Primary Examiner* — Shan Elahi
(74) *Attorney, Agent, or Firm* — Birch, Stewart, Kolasch & Birch, LLP

(57) ABSTRACT

A signal transmitting method, a signal transmitting apparatus, and a signal receiving method, and a signal receiving apparatus are discussed, The signal transmitting method according to an embodiment includes encoding ultra high definition (UHD) video data; and encoding signaling information. A service type indicates a UHD digital television service using high efficiency video coding (HEVC). The signaling information includes linkage information. When a linkage type has one of specific values, the linkage type indicates additional linkage information. The UHD digital television service is signaled based on a link type and the linkage type. When a first value of the linkage type is used, an existing service is linked to a target UHD digital televi- (Continued)

sion service. When a second value of the linkage type is used, a UHD digital television service is linked to an existing service including a high definition or 3D service.

15 Claims, 10 Drawing Sheets

(51) Int. Cl.
*H04N 21/236* (2011.01)
*H04N 21/434* (2011.01)

(58) Field of Classification Search
USPC .................................................. 375/240.02
See application file for complete search history.

(56) References Cited

U.S. PATENT DOCUMENTS

| | | | | |
|---|---|---|---|---|
| 2005/0063466 A1* | 3/2005 | Etoh | ............... | H04N 9/8042 375/240.16 |
| 2006/0171423 A1* | 8/2006 | Helms | .............. | H04J 3/1682 370/535 |
| 2007/0016418 A1* | 1/2007 | Mehrotra | ........... | G10L 19/0017 704/240 |
| 2008/0095234 A1* | 4/2008 | Wang | ................ | H04N 19/142 375/240.13 |
| 2010/0183077 A1* | 7/2010 | Lee | .................. | H04N 19/61 375/240.24 |
| 2010/0195712 A1* | 8/2010 | Yu | ................... | H04N 19/61 375/240.01 |
| 2010/0226366 A1* | 9/2010 | Lee | .................. | H04H 40/18 370/389 |
| 2011/0055887 A1* | 3/2011 | Vare | ................. | H04L 12/1836 725/116 |
| 2011/0141364 A1 | 6/2011 | Lee et al. | | |
| 2011/0261155 A1 | 10/2011 | Tsuruga et al. | | |
| 2013/0081087 A1 | 3/2013 | Lee et al. | | |
| 2013/0174209 A1 | 7/2013 | Jung et al. | | |
| 2013/0242050 A1* | 9/2013 | Choi | ................. | H04N 13/004 348/43 |
| 2014/0029922 A1* | 1/2014 | Goldfeder | ....... | H04N 21/23424 386/284 |
| 2014/0118490 A1 | 5/2014 | Suh et al. | | |
| 2014/0140415 A1* | 5/2014 | Choe | ............... | H04N 21/23439 375/240.25 |
| 2014/0168512 A1* | 6/2014 | Suh | .................. | H04N 21/845 348/441 |
| 2015/0189224 A1* | 7/2015 | Gallagher | ........ | H04N 7/015 348/487 |
| 2015/0281744 A1* | 10/2015 | Chapman | ......... | H04N 21/21805 725/37 |
| 2015/0382024 A1* | 12/2015 | Oh | .................... | H04N 7/015 375/240.25 |
| 2016/0029091 A1* | 1/2016 | Le Floch | ........ | H04N 21/234345 375/240.26 |
| 2017/0006316 A1* | 1/2017 | Hwang | ............ | H04N 13/0066 |

FOREIGN PATENT DOCUMENTS

| | | |
|---|---|---|
| EP | 2 101 502 A1 | 9/2009 |
| JP | 2010-74238 A | 4/2010 |
| JP | 2011-244308 A | 12/2011 |
| JP | 2011-244411 A | 12/2011 |
| JP | 2012-110050 A | 6/2012 |
| KR | 10-2009-0098704 A | 9/2009 |
| KR | 10-2010-0044910 A | 4/2010 |
| KR | 10-2011-0068821 A | 6/2011 |
| KR | 10-2012-0058700 A | 6/2012 |
| KR | 10-2012-0062551 A | 6/2012 |
| KR | 10-2012-0123147 A | 11/2012 |
| WO | WO 2011/122914 A2 | 10/2011 |
| WO | WO 2011/148554 A1 | 12/2011 |
| WO | WO 2012/070715 A1 | 5/2012 |
| WO | WO 2013/021655 A1 | 2/2013 |
| WO | WO 2014/025213 A1 | 2/2014 |

OTHER PUBLICATIONS

DVB, "Digital Video Broadcasting (DVB); Specification for Service Information (SI) in DVB systems," DVB Document A38, Jan. 2011, pp. 1-157.

Lee et al., "Thought on loudspeakers' interference with the screen in UHDTV service," ISO/IEC JTC1/SC29/WG11 MPEG2011/M22659, Nov. 2011, Geneva, Switzerland, 6 pages.

* cited by examiner

FIG. 3

| Syntax | No. of bits | Identifier |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i<N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j=0; j<N; j++) { | | |
|             descriptor() | | |
|         } | | |
|     } | | |
|     CRC_32 | 32 | rpchof |
| } | | |

| Syntax | Number of bits | Identifier |
|---|---|---|
| service_descriptor ( ) { | | |
|     descriptor_tag | 8 | uimsbf |
|     descriptor_length | 8 | uimsbf |
|     service_type | 8 | uimsbf |
|     service_provider_name_length | 8 | uimsbf |
|     for ( i = 0 ; i<N ; i++ ) { | | |
|         char | 8 | uimsbf |
|     { | | |
|     service_name_length | 8 | uimsbf |
|     for ( i = 0 ; i<N ; i++ ) { | | |
|         char | 8 | uimsbf |
|     { | | |
| { | | |

0x20 - UHD digital television service (4K) using AVC/H.264
0x21 - UHD digital television service (4K) using HEVC
0x22 - UHD digital television service (8K) using AVC/H.264
0x23 - UHD digital television service (8K) using HEVC

FIG. 4

| Syntax | No. of bits | Identifier |
|---|---|---|
| event_information_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (i=0; i< N; i++) { | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for (i=0; i< N; i++) { | | |
|       descriptor() | | |
|     } | | |
|   } | | |
|   CRC_32 | 32 | rpchof |
| } | | |

| Syntax | Number of bits | Identifier |
|---|---|---|
| component_descriptor ( ) { | | |
|   descriptor_tag | 8 | uimsbf |
|   descriptor_length | 8 | uimsbf |
|   reserved_future_use | 4 | bslbf |
|   stream_content | 4 | uimsbf |
|   component_type | 8 | uimsbf |
|   component_tag | 8 | uimsbf |
|   ISO_639_language_code | 24 | bslbf |
|   for ( i = 0 ; i<N ; i + + ) { | | |
|     text_char | 8 | uimsbf |
|   { | | |
| { | | |

→ Signal information regarding features of UHD video stream using stream_content and component_type fields

FIG. 5

| stream_content | component_type | Meaning |
|---|---|---|
| 0x05 | 0x90 | H.264/AVC 4K UHD video, 16:9, 25Hz |
| | 0x91 | H.264/AVC 4K UHD video, wide screen (beyond 16:9), 25Hz |
| | 0x92 | H.264/AVC 4K UHD video, 16:9, 30Hz |
| | 0x93 | H.264/AVC 4K UHD video, wide screen (beyond 16:9), 30Hz |
| 0x09 | 0x01 | HEVC 4K UHD video, 16:9, 25Hz, 8 - bit |
| | 0x02 | HEVC 4K UHD video, wide screen (beyond 16:9), 25Hz, 8 - bit |
| | 0x03 | HEVC 4K UHD video, 16:9, 30Hz, 8 - bit |
| | 0x04 | HEVC 4K UHD video, wide screen (beyond 16:9), 30Hz, 8 - bit |
| | 0x05 | HEVC 4K UHD video, 16:9, 50Hz, 8 - bit |
| | 0x06 | HEVC 4K UHD video, wide screen (beyond 16:9), 50Hz, 8 - bit |
| | 0x07 | HEVC 4K UHD video, 16:9, 60Hz, 8 - bit |
| | 0x08 | HEVC 4K UHD video, wide screen ( beyond 16:9 ), 60Hz, 8 - bit |
| | 0x09 | HEVC 4K UHD video, 16:9, 25Hz, 10 - bit |
| | 0x0A | HEVC 4K UHD video, wide screen ( beyond 16:9 ), 25Hz, 10 - bit |
| | 0x0B | HEVC 4K UHD video, 16:9, 30Hz, 10 - bit |
| | 0x0C | HEVC 4K UHD video, wide screen ( beyond 16:9 ), 30Hz, 10 - bit |
| | 0x0D | HEVC 4K UHD video, 16:9, 50Hz, 10 - bit - |
| | 0x0E | HEVC 4K UHD video, wide screen ( beyond 16:9 ), 50Hz, 10 - bit |
| | 0x0F | HEVC 4K UHD video, 16:9, 60Hz, 10 - bit |
| | 0x10 | HEVC 4K UHD video, wide screen ( beyond 16:9 ), 60Hz, 10 - bit |

FIG. 6

| Syntax | No. of bits | Mnemonic |
|---|---|---|
| event_information_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i< N; i++) { | | |
|         event_id | | |
|         start_time | | |
|         duration | | |
|         running_status | | |
|         free_CA_mode | | |
|         descriptors_loop_length | | |
|         for (i=0; i< N; i++) { | | |
|             descriptor() | | |
|         } | | |
|     } | | |
|     CRC_32 | | |
| } | | |

When UHD event/service corresponding to existing event/service is informed, 0x0F is used as linkage_type value. (When HD/3D corresponding to UHD event/service is informed, on the other hand, 0x0E is used.)

| Syntax | No. of bits | Identifier |
|---|---|---|
| linkage_descriptor ( ) { | | |
|     descriptor_tag | 8 | uimsbf |
|     descriptor_length | 8 | uimsbf |
|     transport_stream_id | 16 | uimsbf |
|     original_network_id | 16 | uimsbf |
|     service_id | 16 | uimsbf |
|     linkage_type | 8 | uimsbf |
|     if (linkage_type == 0x08 ) { | | |
|         mobile_hand-over_info ( ) | | |
|     } else if (linkage_type == 0x0D) { | | |
|         event_linkage_info ( ) | | |
|     } else if (linkage_type == 0x0E) { | | |
|         extended_event_linkage_info ( ) | | |
|     } else if (linkage_type == 0x0F) { | | |
|         advanced_event_linkage_info ( ) | | |
|     } | | |

FIG. 7

| Syntax | Number of bits | Identifier |
|---|---|---|
| advanced_event_linkage_info ( ) { | | |
| num_link_event | 8 | uimsbf |
| for ( i = 0; i < N; i++) { | | |
| link_simulcast | 1 | bslbf |
| link_delivery_type | 3 | uimsbf |
| link_type | 3 | uimsbf |
| detail_info_flag | 1 | bslbf |
| link_event_id | 16 | uimsbf |
| link_original_network_id | 16 | uimsbf |
| link_transport_stream_id | 16 | uimsbf |
| link_service_id | 16 | uimsbf |
| if ( detail_info_flag = = '1' ) { | | |
| delivery_detail_info ( ) | | |
| } | | |
| if ( link_simulcast = = '0' ) { | | |
| time_shift_detail_info ( ) | | |
| } | | |
| } | | |
| } | | |

FIG. 8

| stream_content | component_type | Meaning |
|---|---|---|
| 0x03 | 0x16 | DVB subtitles for display on 4K ultra high definition monitor |

FIG. 9

| Syntax | No. of bits | Identifier |
|---|---|---|
| subtitling_descriptor ( ) { | | |
|    descriptor_tag | 8 | uimsbf |
|    descriptor_length | 8 | uimsbf |
|    for ( i = 0; i<N; i++) { | | |
|      ISO_639_language_code | 24 | bslbf |
|      (subtitling_type) | 8 | bslbf |
|      composition_page_id | 16 | bslbf |
|      anoillary_page_id | 16 | bslbf |
|    } | | |
| } | | |

In a case in which subtitling_type is 0x16, corresponding subtitle is subtitle stream having 4K ultra high definition resolution.

SIGNAL TRANSCEIVING APPARATUS AND SIGNAL TRANSCEIVING METHOD

CROSS REFERENCE TO RELATED APPLICATIONS

This application is the National Phase of PCT International Application No. PCT/KR2013/010485, filed on Nov. 19, 2013, which claims priority under 35 U.S.C. 119(e) to U.S. Provisional Application No. 61/728,184, filed on Nov. 19, 2012, all of which are hereby expressly incorporated by reference into the present application.

TECHNICAL FIELD

The present invention relates to a signal transceiving apparatus and a signal transceiving method.

BACKGROUND ART

Research has been carried out on a method of encoding and decoding an ultra high definition (UHD) video according to the increase of a video signal processing speed. Research has been carried out on a method of processing an HD video as well as a UHD video without difficulty even when the UHD video is received using an existing HD receiver.

For example, it is necessary to provide a method of transmitting 4K content through an existing broadcast network according to the appearance of a camera device that is capable of capturing a video having a size of 4K and a display device that is capable of display the 4K video. In this case, compatibility between a method of providing a 4K broadcast service and an existing HD broadcast must be considered. Up to now, however, a method of transmitting 4K content while being compatible with an existing HD broadcast has not yet been provided.

DISCLOSURE

Technical Problem

It is an object of the present invention to provide a signal transceiving apparatus and a signal transceiving method that can be compatible with an existing HD broadcast while providing an ultra high definition video broadcast service.

It is another object of the present invention to provide a signal transceiving apparatus and a signal transceiving method that are capable of providing an ancillary service necessary for an ultra high definition video broadcast service.

It is a further object of the present invention to provide a signal transceiving apparatus and a signal transceiving method that are capable of displaying a subtitle suitable for an ultra high definition video broadcast service.

Technical Solution

An embodiment of the present invention provides a signal transmitting method including encoding ultra high definition (UHD) video data (S110), encoding signaling information comprising information regarding a UHD broadcast service based on the encoded UHD video data and information regarding characteristics of the encoded UHD video data (S120), and multiplexing the encoded UHD video data and the signaling information and transmitting the multiplexed data.

The information regarding the UHD broadcast service may be signaled to service_type in a descriptor of a service description table (SDT). The characteristics of the encoded UHD video data may be signaled according to a stream_content value and a component_type value of an event information table (EIT).

The signaling information may include an EIT and the EIT may include link information capable of connecting the UHD broadcast service according to the characteristics of the encoded UHD video data.

Another embodiment of the present invention provides a signal receiving method including receiving UHD video data and signaling information comprising information regarding the UHD broadcast service and information regarding characteristics of the encoded UHD video data contained in a multiplexed broadcast signal and demultiplexing the UHD video data and the signaling information (S210), decoding the demultiplexed signaling information (S220), and decoding the demultiplexed UHD video data based on the decoded signaling information (S230).

Another embodiment of the present invention provides a signal transmitting apparatus including an encoder (610) for encoding ultra high definition (UHD) video data, a signaling information encoding unit (620) for encoding signaling information comprising information regarding a UHD broadcast service based on the encoded UHD video data and information capable of being signaled with characteristics of the encoded UHD video data, and a multiplexing unit (630) for multiplexing the encoded UHD video data and the signaling information and for transmitting the multiplexed data.

A further embodiment of the present invention provides a signal receiving apparatus including a demultiplexing unit (710) for receiving UHD video data and signaling information comprising information regarding the UHD broadcast service and information regarding characteristics of the encoded UHD video data contained in a multiplexed broadcast signal, a signaling information decoding unit (720) for decoding the demultiplexed signaling information, and a video decoder (730) for decoding the demultiplexed UHD video data based on the decoded signaling information.

The subtitle stream may include a parameter for defining a window for a position of the subtitle stream for the service based on the UHD video data, and the parameter may have a window position value for the subtitle according to the service based on the UHD video data.

Advantageous Effects

According to an embodiment of the present invention, a signal transceiving apparatus and a signal transceiving method can be compatible with an existing HD broadcast while providing an ultra high definition video broadcast service According to another embodiment of the present invention, a signal transceiving apparatus and a signal transceiving method are capable of providing an ancillary service necessary for an ultra high definition video broadcast service.

According to a further embodiment of the present invention, a signal transceiving apparatus and a signal transceiving method are capable of displaying a subtitle suitable for an ultra high definition video broadcast service.

DESCRIPTION OF DRAWINGS

FIG. 3 is a view illustrating signaling information according to an embodiment of the present invention.

FIG. 4 is a view illustrating signaling information according to another embodiment of the present invention.

FIG. 5 is a view illustrating the characteristics of a video based on stream_content and component_type field values.

FIG. 6 is a view illustrating signaling information according to a further embodiment of the present invention.

FIG. 7 is a view illustrating an example of a method of signaling a UHD broadcast service or an event.

FIG. 8 is a view illustrating an example of signaling a subtitle stream for a UHD service according to another embodiment of the present invention.

FIG. 9 is a view illustrating subtitle_descriptor.

BEST MODE

Now, embodiments of the present invention will be described with reference to the accompanying drawings.

Figure 1:
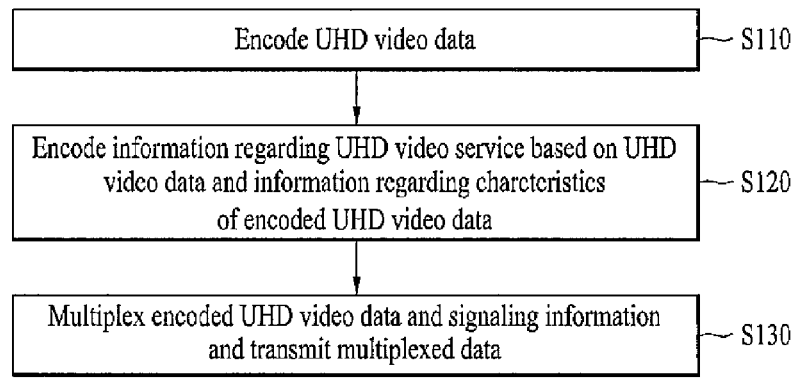
FIG. 1 is a view illustrating a signal transmitting method according to an embodiment of the present invention.

FIG. 1 is a view illustrating a signal transmitting method according to an embodiment of the present invention.

Ultra high definition (UHD) video data are encoded (S110). For example, the UHD video data may have a resolution of 4K, 8K, 16K, etc.

A UHD broadcast service based on the UHD video data and information capable of being signaled with the characteristics of the encoded UHD video data are encoded (S120).

Examples of signaling a UHD video service will hereinafter be described with reference to FIGS. 3, 4, 5, 6, and 7. Examples of signaling information singling the characteristics of the encoded UHD video data are encoded and subtitle information for the UHD video service will hereinafter be described with reference to FIGS. 5, 8, and 9.

The encoded UHD video data and signaling information are multiplexed and then the multiplexed data are transmitted (S130). The multiplexed data may contain a subtitle stream for the UHD video service.

Hereinafter, an embodiment that is capable of recognizing the UHD video service and an embodiment that is capable of transmitting the video signaling information will be described in detail.

Figure 2:
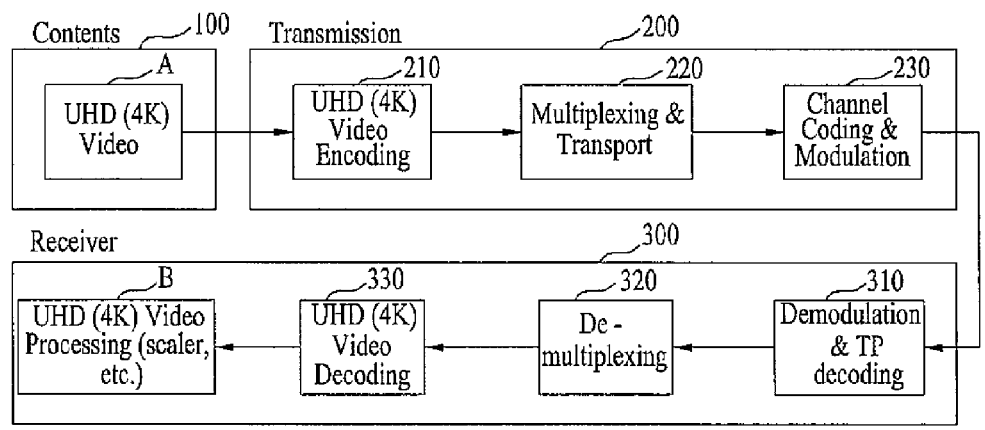
FIG. 2 is a conceptual view illustrating provision of an ultra high definition (UHD) broadcast service according to an embodiment of the present invention.

FIG. 2 is a conceptual view illustrating provision of a UHD broadcast service according to an embodiment of the present invention.

A content provider 100 may create a UHD video as content. For example, the content provider 100 may create a UHD video A providing a UHD broadcast service using a camera that is capable of capturing a 4K UHD video.

A transmitter 200 includes a video encoder 210, a multiplexing unit 220, and a channel coding and modulation unit 230.

The video encoder 210 compresses and encodes a super high resolution (UHD) video. For example, the video encoder 210 may use a coding standard, such as High Efficiency Video Coding (HEVC), to encode a 4K UHD video.

The multiplexing unit 220 multiplexes a stream of the encoded UHD video, another stream, such as an audio stream, and signaling information, which will hereinafter be described, to output a transport stream.

The channel coding and modulation unit 230 channel-codes and multiplexes the transport stream to transmit the transport stream as a broadcast signal.

A receiver 300 includes a demodulation unit 310, a de-multiplexing unit 320, and a video decoder 330.

The demodulation unit 310 receives and demodulates the transmitted broadcast signal to output the transport stream.

The de-multiplexing unit 320 may de-multiplex the transport stream to output the video stream, the audio stream, and the signaling information, which will hereinafter be described.

The video decoder 330 may decode a super high resolution (UHD) video. For example, the video decoder 330 may decode a 4K UHD video B and then process the 4K UHD video. For example, the receiver may perform video processing for display, such as image quality processing and frame rate conversion of the decoded video.

Hereinafter, an embodiment that is capable of transmitting relevant information in a case in which a UHD broadcast service is performed by the system as described above will be described. According to an embodiment of the present invention, for a video having a resolution of 4K, it is possible to transmit detailed information regarding a UHD video component, such as profile information of video coding. In addition, it is possible to transmit an existing service of a HD video, a 4K UHD service interlocked with an event, or information regarding the event. Furthermore, it is possible to transmit not only a channel number of a channel interlocked with a channel transmitting a UHD video but also physical information of the corresponding channel.

To the end, according to an embodiment of the present invention, it is possible to signal information regarding a UHD broadcast service to a service description table (SDT) or an event information table (EIT).

For example, it is possible to signal information indicating that a 4K UHD broadcast service is performed in the corresponding channel using a service_type field of a service descriptor contained in the SDT. According to an embodiment of the present invention, it is possible to signal detailed information of a 4K UHD video using a component descriptor contained in the EIT. The detailed information include resolution information, frame rate information, aspect ratio information, bit depth information and chroma sampling information.

According to an embodiment of the present invention, it is possible to signal information regarding a UHD event or service channel corresponding to an existing service (an HD service, an SD service, a 3D service, etc.) using a linkage descriptor contained in the EIT (or the SDT).

FIG. 3 is a view illustrating signaling information according to an embodiment of the present invention. In this drawing, a service description table (SDT) of service information (SI) is illustrated as signaling information.

Information contained in the SDT is as follows.

A table_id field indicates an identifier of the table.

A section_syntax_indicator field indicates a 1-bit field which is set to 1 for a SDT table section (section_syntax_indicator: The section_syntax_indicator is a 1-bit field which shall be set to "1").

A section_length field indicates the length of a section expressed by the number of bytes (section_length: This is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.)

A transport_stream_id field indicates a TS identifier provided by the SDT while being distinguished from any other multiplex within the delivery system (transport_stream_id: This is a 16-bit field which serves as a label for identification of the TS, about which the SDT informs, from any other multiplex within the delivery system.)

A version_number field indicates a version number of this sub table (version_number: This 5-bit field is the version number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.)

A current_next_indicator field indicates whether this sub table is currently applicable or next applicable (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.)

A section_number field indicates a section number (section_number: This 8-bit field gives the number of the section. The section_number of the first section in the sub_table shall be "0x00". The section_number shall be incremented by 1 with each additional section with the same table_id, transport_stream_id, and original_network_id.)

A last_section_number field indicate the last section number (last_section_number: This 8-bit field specifies the number of the last section (that is, the section with the highest section_number) of the sub_table of which this section is part.)

An original_network_id field indicates an identifier of network ID of the delivery system (original_network_id: This 16-bit field gives the label identifying the network_id of the originating delivery system.)

A service_id field indicates a server identifier within the TS (service_id: This is a 16-bit field which serves as a label to identify this service from any other service within the TS. The service_id is the same as the program_number in the corresponding program_map_section.)

An EIT_schedule_field indicates whether EIT schedule information for the service is present in the current TS (EIT_schedule_flag: This is a 1-bit field which when set to "1" indicates that EIT schedule information for the service is present in the current TS, see TR 101 211 [i.2] for information on maximum time interval between occurrences of an EIT schedule sub_table). If the flag is set to 0 then the EIT schedule information for the service should not be present in the TS.)

An EIT_present_following_flag field indicates whether EIT_present_following information for the service is present in the current TS (EIT_present_following_flag: This is a 1-bit field which when set to "1" indicates that EIT_present_following information for the service is present in the current TS, see TR 101 211 [i.2] for information on maximum time interval between occurrences of an EIT present/following sub_table. If the flag is set to 0 then the EIT present/following information for the service should not be present in the TS.)

A running_status field indicates the status of a service as defined in Table 6 of a DVB-SI document (running_status: This is a 3-bit field indicating the status of the service as defined in table 6. For an NVOD reference service the value of the running_status shall be set to "0".)

A free_CA_mode field indicates whether all the component streams of the service are scrambled (free_CA_mode: This 1-bit field, when set to "0" indicates that all the component streams of the service are not scrambled. When set to "1" it indicates that access to one or more streams may be controlled by a CA system.)

A descriptors_loop_length field indicates the length of the following descriptors (descriptors_loop_length: This 12-bit field gives the total length in bytes of the following descriptors).

CRC_32 is a 32-bit field that contains the CRC value (CRC_32: This is a 32-bit field that contains the CRC value that gives a zero output of the registers in the decoder.)

Service_descriptor may be located at the position of a descriptor following the descriptors_loop_length field.

Service_descriptor may contain the following information.

Descriptor_tag may include an identifier that identifies this descriptor and descriptor_length indicates the length of the descriptor.

Service_type may signal whether a UHD video service is transmitted to a corresponding service or channel.

Service_provider_name_length indicates the length of a service provider displayed as the following char.

Service_name_length indicates the length of a service name displayed as the following char.

For example, service_type of a UHD broadcast service may be assigned using the following values.

In a case in which service_type is 0x20, it indicates a UHD digital television service (4K) using AVC/H.264.

In a case in which service_type is 0x21, it indicates a UHD digital television service (4K) using HEVC.

In a case in which service_type is 0x22, it indicates UHD digital television service (8K) using AVC/H.264.

In a case in which service_type is 0x23, it indicates a UHD digital television service (8K) using HEVC.

FIG. 4 is a view illustrating signaling information according to another embodiment of the present invention. In this drawing, an event information table (EIT) of service information (SI) is illustrated as signaling information.

A table_id field indicates an identifier of the table.

A section_syntax_indicator field indicates a 1-bit field which is set to 1 for an EIT table section (section_syntax_indicator: The section_syntax_indicator is a 1-bit field which shall be set to "1".)

A section_length indicates the length of a section expressed by the number of bytes (section_length: This is a 12-bit field. It specifies the number of bytes of the section, starting immediately following the section_length field and including the CRC. The section_length shall not exceed 4 093 so that the entire section has a maximum length of 4 096 bytes.)

A service_id field indicates a server identifier within the TS (service_id: This is a 16-bit field which serves as a label to identify this service from any other service within a TS. The service_id is the same as the program_number in the corresponding program_map_section.)

A version_number indicates a version number of this sub table (version_number: This 5-bit field is the version number of the sub_table. The version_number shall be incremented by 1 when a change in the information carried within the sub_table occurs. When it reaches value 31, it wraps around to 0. When the current_next_indicator is set to "1", then the version_number shall be that of the currently applicable sub_table. When the current_next_indicator is set to "0", then the version_number shall be that of the next applicable sub_table.)

A current_next_indicator field indicates whether this sub table is currently applicable or next applicable (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.)

A section_number field indicates a section number (section_number: This 8-bit field gives the number of the section. The section_number of the first section in the sub_table shall be "0x00". The section_number shall be incremented by 1 with each additional section with the same table_id, service_id, transport_stream_id, and original_network_id. In this case, the sub_table may be structured as a number of segments. Within each segment the section_number shall increment by 1 with each additional section, but a gap in numbering is permitted between the last section of a segment and the first section of the adjacent segment.)

A last_section_number indicate the last section number (last_section_number: This 8-bit field specifies the number of the last section (that is, the section with the highest section_number) of the sub_table of which this section is part.)

A transport_stream_id field indicates a TS identifier provided by the SDT while being distinguished from any other multiplex within the delivery system (transport_stream_id: This is a 16-bit field which serves as a label for identification of the TS, about which the EIT informs, from any other multiplex within the delivery system.)

An original_network_id field indicates an identifier of network ID of the delivery system (original_network_id: This 16-bit field gives the label identifying the network_id of the originating delivery system.)

A segment_last_section_number field indicates the number of the last section of this segment of the sub_table (segment_last_section_number: This 8-bit field specifies the number of the last section of this segment of the sub_table. For sub tables which are not segmented, this field shall be set to the same value as the last_section_number field.)

A last_table_id field indicates an identifier of the last table (last_table_id: This 8-bit field identifies the last table_id used (see table 2).)

An event_id field indicates an identification number of the event (event_id: This 16-bit field contains the identification number of the described event (uniquely allocated within a service definition.)

A start_time field indicates a start time of the event (start_time: This 40-bit field contains the start time of the event in Universal Time, Co-ordinated (UTC) and Modified Julian Date (MJD) (see annex C). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to "1".)

A running_status field indicates the status of an event as defined in Table 6 of a DVB-SI document (running_status: This is a 3-bit field indicating the status of the event as defined in table 6. For an NVOD reference event the value of the running_status shall be set to "0".)

A free_CA_mode field indicates whether all the component streams of the service are scrambled (free_CA_mode: This 1-bit field, when set to "0" indicates that all the component streams of the event are not scrambled. When set to "1" it indicates that access to one or more streams is controlled by a CA system.)

A descriptors_loop_field indicates the length of the following descriptors (descriptors_loop_length: This 12-bit field gives the total length in bytes of the following descriptors.)

CRC_32 is a 32-bit field that contains the CRC value (CRC_32: This is a 32-bit field that contains the CRC value that gives a zero output of the registers in the decoder)

Component_descriptor may be included at the position of a descriptor following the descriptors_loop_length field.

The component descriptor is located in the EIT (or a descriptor loop of the SDT) to inform of characteristics of a video (and audio) stream contained in a corresponding event. The receiver may determine whether it is possible to decode the corresponding event using this information.

The receiver may signal information regarding the characteristics of the UHD video stream using a stream_content field and a component_type field in component_descriptor. That is, the receiver may signal may check the characteristics of the video including codec types of the video stream contained in the corresponding event (or service) using the stream_content field and the component_type field.

Component_descriptor includes descriptor_tag including an identifier that identifies this descriptor and descriptor_length indicating the length of the descriptor.

The stream_content field indicates the type of a stream and the component_type field indicates a video or audio data type. A combination of the stream or component types based on these two fields will hereinafter be described in detail.

Component_tag has the same value as a component_tag field of a stream identifier descriptor.

An ISO_639_language_code field indentifies a language of the component. A Text_char field indicates the text description of the component stream.

The receiver may signal information regarding characteristics of a UHD video stream using the stream_content field and the component_type field. Consequently, the receiver may know the characteristics of the video including the codec types of the UHD video stream contained in the corresponding event (or service) using the stream_content field and the component_type field of the received SDT and display a service using the same.

FIG. 5 is a view illustrating the characteristics of the video based on the stream_content and component_type field values as described above. For example, in this embodiment, the characteristics of the video is illustrated based on a stream transporting a video having a 4:2:0 sampling chroma format.

For example, in a case in which a stream_content field for a specific stream is 0x05 and a component_type field value for the specific stream is 0x90, a component transported through the stream indicates video data having an H.264/AVC codec, a 4K UHD video resolution, an aspect ratio of 16:9, and a frame rate of 25 Hz.

In a case in which the stream_content field is 0x05 and the component_type field value is 0x91, a component transported through the stream indicates video data having an H.264/AVC codec, a 4K UHD video resolution, an aspect ratio of 16:9 or more (a wide screen aspect ratio), and a frame rate of 25 Hz.

In a case in which the stream_content field is 0x05 and the component_type field value is 0x92, a component transported through the stream indicates video data having an H.264/AVC codec, a 4K UHD video resolution, an aspect ratio of 16:9, and a frame rate of 30 Hz.

In a case in which the stream_content field is 0x05 and the component_type field value is 0x93, a component transported through the stream indicates video data having an H.264/AVC codec, a 4K UHD video resolution, an aspect ratio of 16:9 or more (a wide screen aspect ratio), and a frame rate of 30 Hz.

Similarly, in a case in which a stream_content field for a specific stream is 0x09 and a component_type field value for the specific stream is 0x01, a component transported through the stream indicates video data having an HEVC codec, a 4K UHD video resolution, an aspect ratio of 16:9, a frame rate of 25 Hz, and a bit-depth format of 8 bits.

In addition, similarly, in a case in which a stream_content field for a specific stream is 0x09 and a component_type field value for the specific stream is 0x02, a component transported through the stream indicates video data having an HEVC codec, a 4K UHD video resolution, an aspect ratio of 16:9 or more (a wide screen aspect ratio), a frame rate of 25 Hz, and a bit-depth format of 8 bits.

The characteristics of the video transmitted by other video components may be signaled as illustrated in this drawing.

This embodiment has been illustrated based on the video stream having the 4:2:0 chroma format. A 12-bit mode may also be added through extension of the illustrated list. In this case, for example, component_type may have a value of 0x11 to 0x18 based on a combination of the codec, the resolution, the aspect ratio, and the frame rate.

For a video stream having a 4:2:0 chroma format, for example, a value of 0x19 to 0x30 based on a combination of the codec, the resolution, the aspect ratio, and the frame rate may be assigned as the component_type.

In the same manner, for an 8K UHD video stream, for example, a value of 0x31 to 0x60 based on a combination of the codec, the resolution, the aspect ratio, and the frame rate may be assigned as the component_type.

As a result, it is possible to inform the current event or a future event of whether a UHD broadcast service or event is provided.

FIG. 6 is a view illustrating signaling information according to a further embodiment of the present invention. This drawing illustrates linkage_descriptor ( ) contained in an event information table (EIT) of service information (SI).

A transport_stream_id field indicates an identifier that identifies a TS including an information service, an original_network_id field indicates a network identifier of the original delivery system.

A service_id field identifies an information service in the TS.

A linkage_type field indicates the type of a linkage connecting the information service.

Another embodiment that informs of information regarding a UHD broadcast corresponding to a broadcast service that a user is being currently viewing is as follows.

When an UHD event/service corresponding to an existing event or service is informed, 0x0F may be used as a value of linkage_type. When an HD service or a 3D service corresponding to an UHD event/service is informed, on the other hand, 0x0E may be used.

For example, in a case in which a linkage_type field is 0x0F, a descriptor that is capable of signaling an UHD event/service (advanced_event_linkage_info ( )) may be included, which will hereinafter be described in detail with reference to the following drawings.

As another example that is capable of a UHD broadcast service, in a case in which a linkage_type field is 0x0F, an existing extended_event_linkage_info ( ) may be used instead of advanced_event_linkage_info ( ).

That is, a new linkage_type value (for example, 0x0F) may be assigned to signal that a target (or linked) event or service is UHD and the UHD service may be informed through a combination of link_type and linkage_type values, which will hereinafter be illustrated.

In addition, the existing extended_event_linkage_info ( ) may be utilized in the same way as before.

The UHD service may be signaled using only a link_type field of extended_event_linkage_info ( ) For example, in a case in which link_type is 0, a 4K UHD, 8-bit, and 4:2:0 sampling video may be signaled. In a case in which link_type is 1, a 4K UHD, 10-bit, and 4:2:2 sampling video may be signaled. In a case in which link_type is 2, a 4K UHD, 12-bit, and 4:2:2 sampling video may be signaled.

FIG. 7 is a view illustrating an example of a method of signaling a UHD broadcast service or an event. In this drawing, advanced_event_linkage_info ( ) included in linkage_descriptor as illustrated above is illustrated.

For example, in a case in which a linkage_type field is 0x0F, advanced_event_linkage_info ( ) signaling a UHD broadcast service or an event may be included in linkage_descriptor.

A num_link_event field may indicate the number of links.

A link_simulcast field indicates whether a corresponding event or service is broadcast simultaneously with the current event/service. For example, in a case in which this value is '1', it indicates that corresponding event or service is broadcast simultaneously with the current event/service without a time difference.

A link_delivery_type field may indicate type of a path in which the corresponding event or service is broadcast (terrestrial, satellite, cable, IP, etc.). In a case in which the corresponding event or service is based on the same path or the same type, a value of '001' may be designated.

In a case in which the corresponding event or service is based on the same path but a different parameter (for example, a parameter related to a modulation type), on the other hand, information corresponding to the path may be designated (for example, a value between '010' and '100'). Detailed parameter information may be signaled through delivery_detail_info ( ). The link_delivery_type field may signal the same transmission path, cable, IP, or terrestrial of the same event.

Link_type indicates a service type of the corresponding event or service. For example, link_type may indicate the following information of a UHD video based on respective values.

'001'—4K UHD, 8-bit, and 4:2:0
'010'—4K UHD, 10-bit, and 4:2:0
'011'—4K UHD, 10-bit, and 4:2:2

In addition, link_event_id, link_original_network_id, link_transport_stream_id, link_service_id fields indicate an event identifier (event_id), original_network_id, transport_stream_id, and service_id of the corresponding event or service, respectively.

Delivery_detail_info ( ) indicates a physical transmission parameter for a linked event or service. For example, it is possible to signal information, such as a modulation type, frequency information, and an FEC type, of event data which are transmitted using the same.

In a case in which there is a time difference between the linked event or service and the current event or service, time_shift_detail_info ( ) signals information regarding the time information. A field informing after when it will be broadcast on a minute basis may be included according to embodiments of the present invention. As another example signaling this value, event_id and time information regarding an event identified by the event_id may be referred to from a relevant EIT.

FIG. 8 is a view illustrating an example of signaling a subtitle stream for a UHD service according to another embodiment of the present invention.

It is possible to identify a component transmitting a subtitle displayed on a monitor that is capable of displaying a UHD video using a value of stream_content and a value of component_type. In a case in which stream_content is 0x03 and component_type is 0x16, the corresponding subtitle may be a subtitle stream having a 4K UHD resolution.

In addition, in a case in which a type value of an elementary stream (ES) is 0x06, the stream transmits the subtitle. In this case, subtitle_descriptor( )) may be included at the position of a descriptor of a PMT as illustrated in FIG. 9.

An ISO_639_language_code field indicates character language code of a language of the subtitle.

A subtitling_type field indicates information regarding display and subtitle content. For example, in a case in which subtitling_type is 0x16, the corresponding subtitle may be a subtitle stream having a 4K UHD resolution.

A composition_page_id field indicates information that identifies a composition page.

An ancillary_page_id field indicates information that identifies an ancillary (selective) page.

In addition, in a case in which, for a UHD service having a size of 3840×2160, the size of a subtitle has a HD resolution (1920×1080), parameters that define a window for the subtitle may be defined as follows in the subtitle stream.

The position of the leftmost pixel of the subtitle that is relatively positioned at the leftmost pixel of the display (display_window_horizontal_position_minimum) may be defined as 960.

The position of the rightmost pixel of the subtitle that is relatively positioned at the rightmost pixel of the display (display_window_horizontal_position_minimum) may be defined as 2879.

The position of the uppermost pixel of the subtitle that is relatively positioned at the uppermost pixel of the display (display_window_vertical_position_minimum) may be defined as 540.

The position of the lowermost pixel of the subtitle that is relatively positioned at the lowermost pixel of the display (display_window_vertical_position_maximum) may be defined as 1619. These values may be changed depending upon the size of the resolution of the UHD service.

Figure 10:
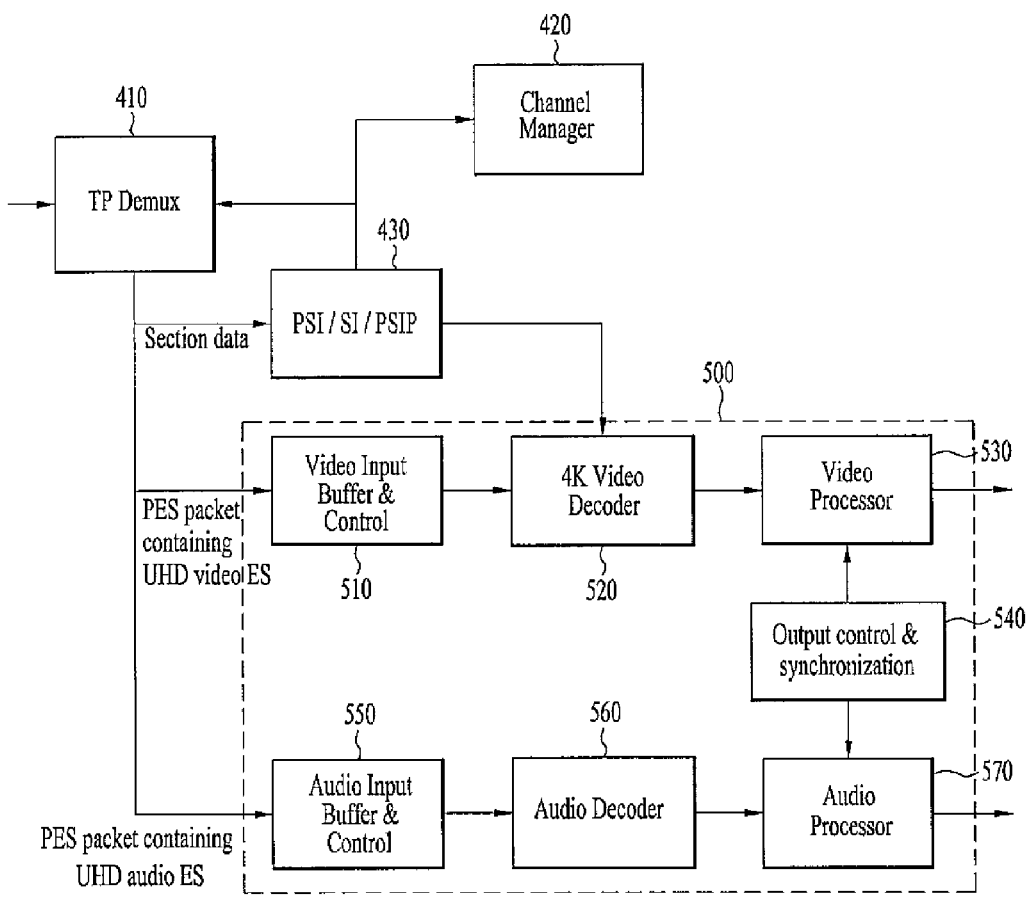
FIG. 10 is a view illustrating a signal receiving apparatus according to an embodiment of the present invention.

FIG. 10 is a view illustrating a signal receiving apparatus according to an embodiment of the present invention.

The signal receiving apparatus according to the embodiment of the present invention may include a demultiplexing unit 410, a signaling information decoding unit 430, and a resource decoding unit 500. The signal receiving apparatus according to the embodiment of the present invention may selectively include a channel manager 420.

The demultiplexing unit 410 may demultiplex a broadcast stream to demultiplex signaling information, a video stream, and an audio stream.

The signaling information decoding unit 430 may decode signaling information, such as section data.

The resource decoding unit 500 may include a video buffer 510, a video decoder 520, a video processor 530, a synchronization unit 540, an audio buffer 550, an audio decoder 560, and an audio processor 570.

Embodiments in which the signaling information decoding unit 430 identifies a UHD service will hereinafter be described.

First, in a first embodiment, it is possible to identify a UHD service using the SDT illustrated in FIG. 3.

The signaling information decoding unit 430 may identify that a UHD service is provided by the corresponding channel using a service descriptor contained in the SDT. In addition, in a case in which component_descriptor is present, the signaling information decoding unit 430 may identify codec type, resolution, chroma sampling, and bit depth information of the video included to provide the UHD service.

In a case in which the signaling information decoding unit 430 decodes information contained in component_descriptor, the signaling information decoding unit 430 may determine whether a video stream or an audio stream provided by the corresponding UHD service can be decoded using an embodiment of the signal receiving apparatus or the resource decoder 500.

The signaling information decoding unit 430 may obtain a PID value for acquiring the video stream and the audio stream included in the corresponding service from the PMT using component_tag specified in component_descriptor. In addition, the signaling information decoding unit 430 may transmit a corresponding PID stream to the video decoder and the audio decoder using the PID value identified in the PMT such that the corresponding PID stream can be decoded.

According to a second embodiment, it is possible to identify a UHD service using the EIT as previously illustrated.

The signaling information decoding unit 430 identifies information regarding an event that provides an UHD broadcast service using component_descriptor contained in the EIT illustrated in FIGS. 4 and 5.

The signaling information decoding unit 430 may identify video specification information and audio specification information that identify each event contained in component_descriptor and identify whether an embodiment of the signal receiving apparatus or the resource decoder 500 can decode the corresponding event based thereupon.

The signaling information decoding unit 430 may identify a component_tag value per stream of component_descriptor and identify a stream matching with the component_tag value using stream_identifier_descriptor of the PMT.

The signaling information decoding unit 430 may identify a PID stream matching with component_tag using the PMT at the time when the corresponding event is actually broadcast and the resource decoder 500 may decode a video stream and an audio stream having the identified PID value.

According to a third embodiment, it is possible to identify a UHD service using linkage_ descriptor as previously illustrated.

An embodiment of the signal receiving apparatus displays an HD event. In a case in which a linkage descriptor for the corresponding event illustrated in FIGS. 6 and 7 is present, the signaling information decoding unit 430 may parse a linkage descriptor.

In a case in which a linkage_type field value in the linkage descriptor is 0x0F, the signaling information decoding unit 430 may identify a UHD broadcast event or service linked to the HD event. The signaling information decoding unit 430 may decode advanced_event_linkage_info ( ) that is capable of identifying the linked UHD broadcast event or service in detail.

The signaling information decoding unit 430 may decode detailed information that is capable of receiving information regarding the linked UHD broadcast event using information in advanced_event_linkage_info ( ).

An embodiment of the signal receiving apparatus may inform a user that a UHD broadcast service corresponding to the HD event which the user is currently viewing is provided using the corresponding information. In a case in which the user selects a UHD broadcast service receiving signal, the signal receiving apparatus may receive and display the UHD broadcast service using information in advanced_event_linkage_info ( ).

The resource decoder 500 may include a video buffer 510, a video decoder 520, a video processor 530, a synchronization unit 540, an audio buffer 550, an audio decoder 560, and an audio processor 570.

The video stream de-multiplexed by the demultiplexing unit 410 may be input to the video buffer 510. In this example, the video stream may be a PES packet including a UHD video elementary stream. The video buffer 510 may temporarily store video data of the input video stream.

The video decoder 520 may receive the video data stored in the video buffer 510 on a predetermined unit basis and perform video decoding. In this example, the decoder decodes 4K video data. In addition, the decoder may also output 8K or 16K video data.

For example, the video decoder 520 may decode the corresponding video data according to the characteristics of the video data based on the decoded signaling information as illustrated in FIG. 5.

The video processor 530 may perform post-processing for the decoded video data. As a result, the video processor 530 may adjust the decoded video data such that the decoded video data can be naturally displayed.

On the other hand, the audio stream de-multiplexed by the demultiplexing unit 410 may be input to the audio buffer 550. In this example, the audio stream may be a PES packet including a UHD audio elementary stream. The audio buffer 510 may temporarily store the input audio data.

The audio decoder 560 may receive the audio data stored in the audio buffer 510 on a predetermined unit basis and perform audio decoding. The audio processor 570 may perform post-processing for the decoded audio data.

The synchronization unit 540 may synchronize and output the two types of the decoded data such that the data output by the video processor 530 and the audio processor 570 can be displayed on the same screen.

The channel manager 420 may control information necessary for channel switching based on the signaling information decoded by the signaling information decoding unit 430. For example, when the user transmits a channel switching signal, the channel manager 420 may receive the channel switching signal and control channel switching to be performed. Alternatively, the channel manager 420 may determine whether it is possible to receive a specific channel using the signaling information or create a channel list and perform an operation related to channels.

Figure 11:
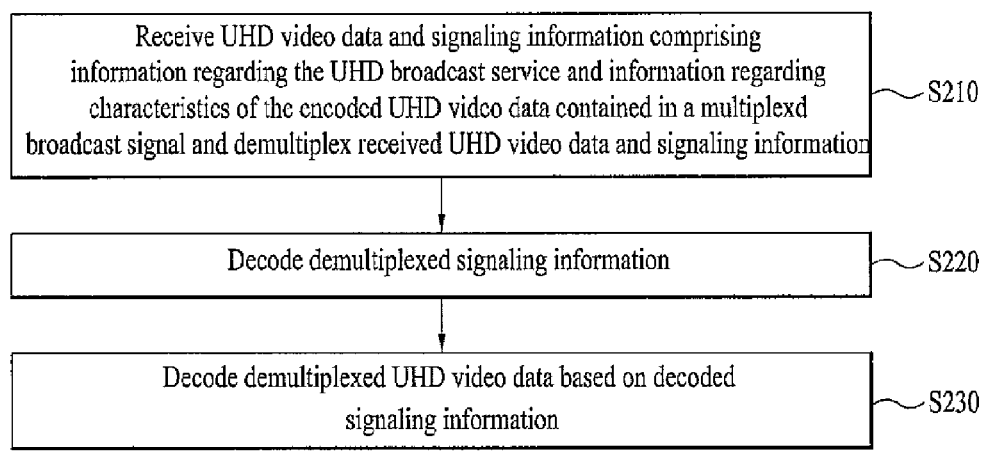
FIG. 11 is a view illustrating a signal receiving method according to an embodiment of the present invention.

FIG. 11 is a view illustrating a signal receiving method according to an embodiment of the present invention.

UHD video data contained in a multiplexed broadcast signal and signaling information that is capable of signaling a service based on the UHD video data are received and the received UHD video data and signaling information are demultiplexed (S210).

The multiplexed broadcast signal may contain a subtitle stream for a UHD service. The subtitle stream may contain information regarding the subtitle stream for the UHD service. Information that identifies the subtitle stream for the UHD service, among the demultiplexed signaling information, has been previously described with reference to FIGS. 8 and 9.

The demultiplexed signaling information is decoded (S220). The demultiplexed signaling information has been previously described with reference to FIGS. 3, 4, 5, 6, and 7. For example, it is possible to identify a UHD video service contained in the video data using the SDT, the EIT or linkage_descriptor contained in the EIT.

The demultiplexed UHD video data are decoded based on the decoded signaling information (S230). The UHD video data may be decoded.

Figure 12:
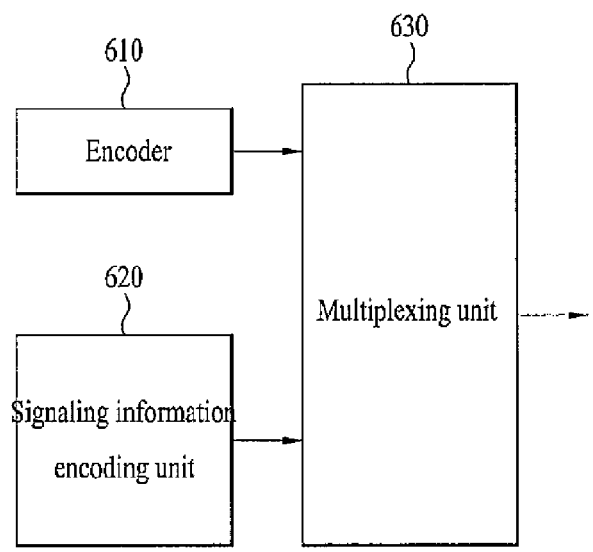
FIG. 12 is a view illustrating a signal transmitting apparatus according to an embodiment of the present invention.

FIG. 12 is a view illustrating a signal transmitting apparatus according to an embodiment of the present invention.

An encoder 610 encodes UHD video data. For example, the encoded UHD video data may have a resolution of 4K, 8K, or 16K.

A signaling information encoding unit 620 encodes a UHD broadcast service based on the UHD video data and information that is capable of being signaled with the characteristics of the encoded UHD video data. Examples of signaling a UHD video service have been previously described with reference to FIGS. 3, 4, 5, 6, and 7. The characteristics of the encoded UHD video data are illustrated in FIG. 5.

A multiplexing unit 630 multiplexes and transmits the encoded UHD video data and signaling information. The multiplexed broadcast signal may contain a subtitle stream for a UHD service.

The subtitle stream may contain information regarding the subtitle stream for the UHD service. Information that identifies the subtitle stream for the UHD service, among the demultiplexed signaling information, has been previously described with reference to FIGS. 8 and 9.

The multiplexed subtitle stream may contain information regarding the corresponding subtitle. For example, in a case in which, for a UHD service having a size of 3840×2160, the size of a subtitle has a HD resolution (1920×1080), parameters that define a window for the subtitle may be defined as follows in the subtitle stream.

The position of the leftmost pixel of the subtitle that is relatively positioned at the leftmost pixel of the display (display_window_horizontal_position_minimum) may be defined as 960.

The position of the rightmost pixel of the subtitle that is relatively positioned at the rightmost pixel of the display (display_window_horizontal_position_minimum) may be defined as 2879.

The position of the uppermost pixel of the subtitle that is relatively positioned at the uppermost pixel of the display (display_window_vertical_position_minimum) may be defined as 540.

The position of the lowermost pixel of the subtitle that is relatively positioned at the lowermost pixel of the display (display_window_vertical_position_maximum) may be defined as 1619. These values may be changed depending upon the size of the resolution of the UHD service.

That is, the parameters may have window position values for the subtitle according to the UHD service.

Figure 13:
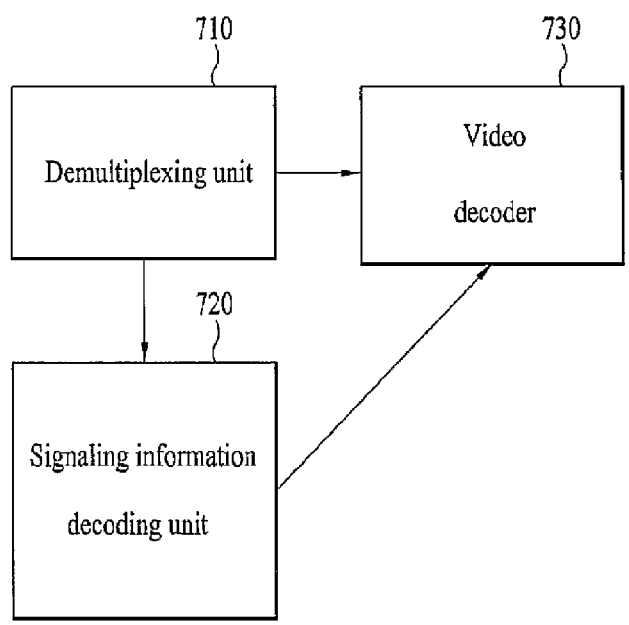
FIG. 13 is a view illustrating a signal receiving apparatus according to another embodiment of the present invention.

FIG. 13 is a view illustrating a signal receiving apparatus according to another embodiment of the present invention.

A demultiplexing unit 710 receives UHD video data and signaling information comprising information regarding the UHD broadcast service and information regarding characteristics of the encoded UHD video data contained in a multiplexed broadcast signal and demultiplexes the received UHD video data and signaling information. For example, the demultiplexing unit 710 is the same as illustrated in FIG. 10.

The multiplexed broadcast signal may contain a subtitle stream for a UHD service. The subtitle stream may contain information regarding the subtitle stream for the UHD service. Information that identifies the subtitle stream for the UHD service, among the demultiplexed signaling information, has been previously described with reference to FIGS. 8 and 9.

A signaling information decoding unit 720 decodes the demultiplexed signaling information. The demultiplexed signaling information has been previously described with reference to FIGS. 3, 4, 5, 6, and 7. For example, it is possible to identify a UHD video service contained in the video data using SDT, EIT or linkage_descriptor contained in EIT. The demultiplexed signaling information may include information regarding the subtitle stream for the UHD service, which has been previously described with reference to FIGS. 8 and 9. For example, the signaling information decoding unit 720 is the same as illustrated in FIG. 10.

A video decoder 730 decodes the demultiplexed UHD video data based on the decoded signaling information. The video decoder 730 may decode subtitle data contained in the subtitle stream for the UHD service. The video decoder 730 may be the same as illustrated in FIG. 10.

MODE FOR INVENTION

Various embodiments for carrying out the invention have been described in the best mode for carrying out the invention.

INDUSTRIAL APPLICABILITY

The present invention has industrial applicability in that the present invention can be repeatedly used in broadcast and video signal processing fields.

The invention claimed is:

1. A signal transmitting method comprising:
   encoding ultra high definition (UHD) video data by an encoder;
   encoding signaling information comprising service description information by a signaling information encoder,
   wherein the service description information includes a first information having a service type, and the service type specifies a type of a service,
   wherein when the service type has a specific coded value, the service type indicates a UHD digital television service using high efficiency video coding (HEVC),
   wherein the service description information includes a second information, and the second information includes information on characteristics of the encoded UHD video data,
   wherein the signaling information includes event information and the event information includes linkage information,
   wherein the linkage information includes a linkage type, and when the linkage type has one of specific values, the linkage type indicates additional linkage information,
   wherein the additional linkage information includes link type information which indicates a type of a linked service,
   wherein the UHD digital television service are signaled based on a combination of values of a link type and the linkage type,
   wherein when a first value of the linkage type is used for the additional linkage information, an existing service is linked to a target UHD digital television service, and
   wherein when a second value of the linkage type is used, a UHD digital television service is linked to an existing service including a high definition or 3D service; and
   multiplexing the encoded UHD video data and the signaling information by a multiplexer; and
   transmitting the multiplexed data by a transmitter.

2. The signal transmitting method according to claim 1, wherein the characteristics of the encoded UHD video data are signaled based on a combination of a stream content value and a component type value.

3. The signal transmitting method according to claim 1, wherein the characteristics of the encoded UHD video data include video codec information of the encoded UHD video data and the video codec information indicates that the encoded UHD video data is video data encoded by an HEVC codec.

4. The signal transmitting method according to claim 1, wherein the characteristics of the encoded UIID video data include a frame rate of the encoded UHD video data and the frame rate represents any one of 25 Hz, 30 Hz, 50 Hz, and 60 Hz.

5. A signal receiving method comprising:
   receiving ultra high definition (UHD) video data and signaling information comprising service description information by a receiver;
   demultiplexing the UHD video data and the signaling information by a demultiplexer,
   wherein the service description information includes a first information having a service type, and the service type specifies a type of a service,
   wherein when the service type has a specific coded value, the service type indicates a UHD digital television service using high efficiency video coding (HEVC),
   wherein the service description information includes a second information, and the second information includes information on characteristics of encoded UHD video data,
   wherein the signaling information includes event information and the event information includes linkage information,
   wherein the linkage information includes a linkage type, and when the linkage type has one of specific values, the linkage type indicates additional linkage information,
   wherein the additional linkage information includes link type information which indicates a type of a linked service,
   wherein the UHD digital television service is signaled based on a combination of values of the link type and the linkage type,
   wherein when a first value of the linkage type is used for the additional linkage information, an existing service is linked to a target UHD digital television service, and
   wherein when a second value of the linkage type is used, a UHD digital television service is linked to an existing service including a high definition or 3D service;
   decoding the demultiplexed signaling information by a signaling decoder; and
   decoding the demultiplexed UHD video data based on the decoded signaling information by a decoder.

6. The signal receiving method according to claim 5, wherein the characteristics of the encoded UHD video data are signaled based on a combination of a stream content value and a component type value.

7. The signal receiving method according to claim 5, wherein the characteristics of the encoded UHD video data include video codec information of the encoded UHD and the video codec information indicates that the encoded UHD video data is video data encoded by an HEVC codec.

8. The signal receiving method according to claim 5, wherein the characteristics of the encoded UHD video data include a frame rate of the encoded UHD video data and the frame rate represents any one of 25 Hz, 30 Hz, 50 Hz, and 60 Hz.

9. A signal transmitting apparatus comprising:
an encoder configured to encode ultra high definition (UHD) video data;
a signaling information encoder configured to encode signaling information comprising service description information,
wherein the service description information includes a first information having a service type, and the service type specifies a type of a service,
wherein when the service type has a specific coded value, the service type indicates a UHD digital television service using high efficiency video coding (HEVC),
wherein the service description information includes a second information, and the second information includes information on characteristics of the encoded UHD video data,
wherein the signaling information includes event information and the event information includes linkage information,
wherein the linkage information includes a linkage type, and when the linkage type has one of specific values, the linkage type indicates additional linkage information,
wherein the additional linkage information includes link type information which indicates a type of a linked service,
wherein the UHD digital television service is signaled based on a combination of values of the link type and the linkage type,
wherein when a first value of the linkage type is used for the additional linkage information, an existing service is linked to a target UHD digital television service, and
wherein when a second value of the linkage type is used, a UHD digital television service is linked to an existing service including a high definition or 3D service;
a multiplexer configured to multiplex the encoded UHD video data and the signaling information; and
a transmitter configured to transmit the multiplexed data.

10. The signal transmitting apparatus according to claim 9, wherein the characteristics of the encoded UHD video data are signaled based on a combination of a stream content value and a component type value.

11. The signal transmitting apparatus according to claim 9, wherein the characteristics of the encoded UHD video data include video codec information of the encoded UHD video data and the video codec information indicates that the encoded UHD video data is video data encoded by an HEVC codec.

12. The signal transmitting apparatus according to claim 9, wherein the characteristics of the encoded UHD video data include a frame rate of the encoded UHD video data and the frame rate represents any one of 25 Hz, 30 Hz, 50 Hz, and 60 Hz.

13. A signal receiving apparatus comprising:
a demultiplexer configured to demultiplex UHD video data and signaling information comprising service description information;
a signaling information decoder configured to decode the demultiplexed signaling information,
wherein the service description information includes a first information having a service type, and the service type specifies a type of a service,
wherein when the service type has a specific coded value, the service type indicates a UHD digital television service using high efficiency video coding (HEVC),
wherein the service description information includes a second information, and the second information includes information on characteristics of encoded UHD video data,
wherein the signaling information includes event information and the event information includes linkage information,
wherein the linkage information includes a linkage type, and when the linkage type has one of specific values, the linkage type indicates additional linkage information,
wherein the additional linkage information includes link type information which indicates a type of a linked service,
wherein the UHD digital television service is signaled based on a combination of values of the link type and the linkage type,
wherein when a first value of the linkage type is used for the additional linkage information, an existing service is linked to a target UHD digital television service, and
wherein when a second value of the linkage type is used, a UHD digital television service is link to an existing service including a high definition or 3D service; and
a video decoder configured to decode the demultiplexed UHD video data based on the decoded signaling information.

14. The signal receiving apparatus according to claim 13, wherein:
the signaling information decoder decodes information identifying a subtitle stream provided to the service based on the UHD video data, and
the video decoder decodes the subtitle stream based on the information identifying the subtitle stream.

15. The signal receiving apparatus according to claim 14, wherein:
the subtitle stream comprises a parameter for defining a window for a position of the subtitle stream for the service based on the UHD video data, and
the parameter has a window position value for the subtitle according to the service based on the UHD video data.

* * * * *